(12) United States Patent
Eisenhart et al.

(10) Patent No.: US 6,778,035 B2
(45) Date of Patent: Aug. 17, 2004

(54) TWO-TIER ACCESSORY FOR CATV LINE TRANSMISSION EQUIPMENT

(75) Inventors: Daniel Eisenhart, Chalfont, PA (US); Mark Paulits, Chalfont, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 10/289,627

(22) Filed: Nov. 7, 2002

(65) Prior Publication Data

US 2004/0090285 A1 May 13, 2004

(51) Int. Cl.[7] .................. H01R 33/945; H05K 5/02; H03H 5/00; H01P 1/22; H01P 5/00
(52) U.S. Cl. ............. 333/24 R; 333/28 R; 333/81 R; 361/752; 361/759; 439/577; 439/620; 439/904
(58) Field of Search ................... 333/100, 22 R, 333/24 R, 28 R, 140, 81 R; 361/751, 756; 439/577, 620, 904

(56) References Cited

U.S. PATENT DOCUMENTS

| | | | | |
|---|---|---|---|---|
| 5,363,432 A | * | 11/1994 | Martin et al. ............ | 379/90.01 |
| 5,581,134 A | * | 12/1996 | Romerein et al. ...... | 307/132 M |
| 5,641,953 A | * | 6/1997 | Fisher, Jr. ................ | 200/50.12 |
| 6,144,561 A | * | 11/2000 | Cannella et al. ............ | 361/796 |
| 6,289,210 B1 | * | 9/2001 | Anderson et al. ........... | 455/351 |

* cited by examiner

*Primary Examiner*—Barbara Summons
(74) *Attorney, Agent, or Firm*—Volpe and Koenig, P.C.

(57) ABSTRACT

An dual-purpose accessory for a line transmission device chassis preferably is disclosed. The accessory preferably includes a housing having a first portion and a second portion. The first portion preferably includes an electronic component contained therein that is in electrical communication with the line transmission device when the accessory is installed therein. The first and second portions are joined by a connection that enables the second portion to be detached from the first portion so that the accessory can be installed in two different types of chassis. One chassis type includes an opening in the chassis for insertion of the accessory, the other does not.

13 Claims, 2 Drawing Sheets

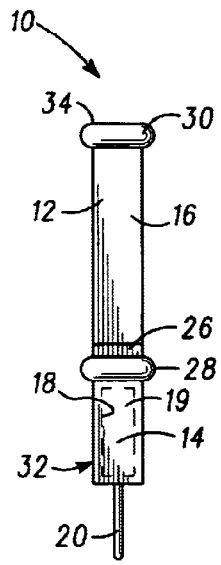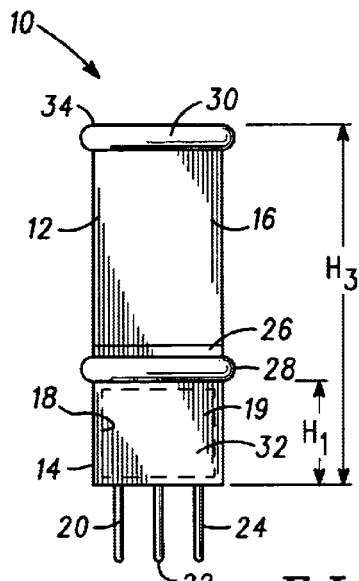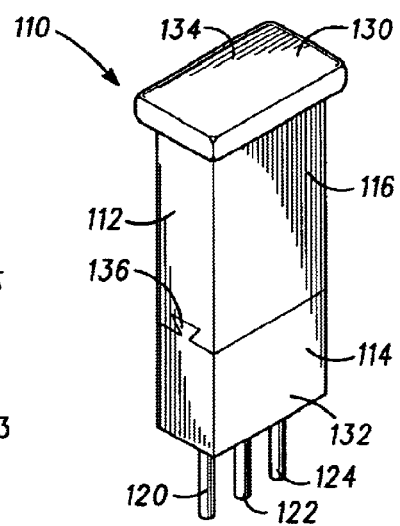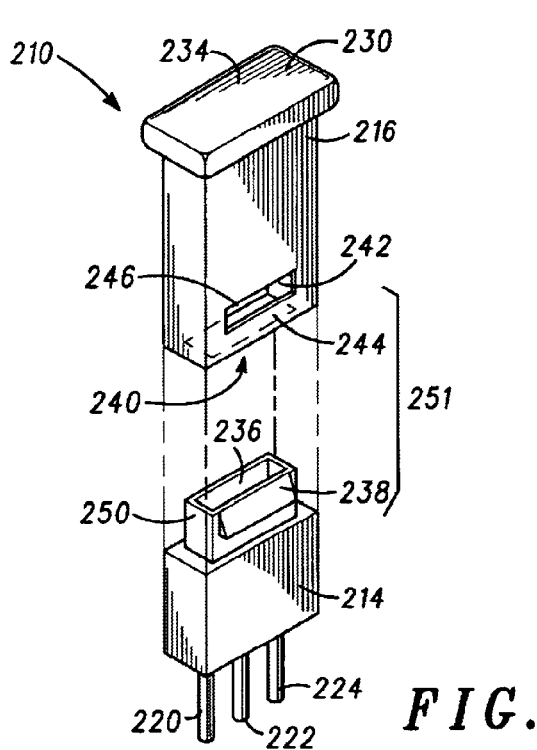
FIG. 1
FIG. 2
FIG. 3
FIG. 4
FIG. 5

TWO-TIER ACCESSORY FOR CATV LINE TRANSMISSION EQUIPMENT

FIELD OF INVENTION

The present invention relates to accessories used with line transmission equipment in a cable television (CATV) network.

BACKGROUND

Installation, replacement and modification of accessories installed in line transmission equipment for CATV networks can be a time consuming and labor intensive process. Accordingly, improvements in the accessibility of line transmission equipment and the accessories used therewith can result in substantial cost savings. Installation or removal of accessories used with older line transmission equipment requires opening both a clam shell-type outer housing, as well as opening an interior chassis cover (usually made of metal). Accessories (for example, attenuator pads and equalizers) used with such older line equipment are sized to fit entirely inside the chassis cover.

Recently, there have been improvements in line transmission equipment that allow accessories to be installed and removed without removing the chassis cover. This is typically accomplished by including an opening in the chassis cover to insert and remove the accessory. In order to allow for easy installation and removal, accessories designed for use with newer line transmission equipment typically have housings that are of sufficient height to protrude from the opening in the chassis cover when installed.

Although older line transmission equipment is gradually being replaced by newer equipment, there is still a need for line transmission equipment accessories that can be used with older line transmission equipment.

SUMMARY

In one respect, the invention comprises an accessory used with a line transmission device having a chassis. The accessory preferably includes a housing having a first portion and a second portion. The first portion preferably includes an electronic component contained therein that is in electrical communication with the line transmission device when the accessory is installed therein. The first and second portions are joined by a connection that enables the second portion to be detached from the first portion.

When the second portion is detached from the first portion and the accessory is installed in the line transmission device, the accessory fits entirely within the chassis. When the second portion is connected to the first portion and the accessory is installed in the line transmission device, the accessory protrudes through an opening in the chassis.

In another respect, the invention comprises a universal accessory used with a first line transmission device including a chassis having a first chassis configuration and a second line transmission device including a chassis having second chassis configuration. The accessory includes a housing having a first portion and a second portion. The first portion includes an electronic component contained therein. The accessory also includes a connection that connects the first portion and second portion and enables the second portion to be detached from the first portion.

When the second portion is detached from the first portion, the accessory is installable in the first line transmission device so that the accessory fits entirely within the chassis of the first line transmission device. When the second portion is connected to the first portion, the accessory is installable in the second line transmission device so that the accessory protrudes through an opening in the chassis of the second chassis configuration to allow installation and removal of the accessory without removing a face plate of the chassis of the second line transmission device.

In another respect, the invention comprises a method of installing an accessory in a line transmission device having a chassis configuration selected from at least first and second chassis configurations. A universal accessory is provided, having a housing including a first portion, a second portion, and a connection that connects the first portion and second portion and enables the second portion to be detached from the first portion The first portion includes an electronic component contained therein. The chassis configuration of the line transmission device is then identifies.

If the line transmission device includes a chassis having the first chassis configuration the face plate is then removed from the chassis of the line transmission device. Then the universal accessory is modified by separating the first portion from the second portion. Then the first portion is installed into the line transmission device so that the electronic component is in electrical communication with the line transmission device. Finally, the face plate to the chassis is re-installed.

If the line transmission device includes a chassis having the second chassis configuration, the universal accessory is installed into the line transmission device through an opening in the chassis so that the electronic component is in electrical communication with the line transmission device.

BRIEF DESCRIPTION OF THE DRAWING(S)

The present invention will hereinafter be described in conjunction with the appended drawing figures wherein like numerals denote like elements, and:

FIG. 1 is a side view of a first embodiment of the present invention in the form of an attenuator pad having a perforated area that allows an upper portion be broken away from a lower portion.

FIG. 2 is a front view of the attenuator pad of FIG. 1.

FIG. 3 is a perspective view of a second embodiment of the present invention in the form of an attenuator pad having upper and lower portions removably joined by a dovetail joint.

FIG. 4 is a perspective view of a third embodiment of the present invention in the form of an attenuator pad having upper and lower portions removably joined by a snap-fit joint.

FIG. 5 is a perspective view of the attenuator pad of FIG. 4 showing the upper and lower portions after separation.

DETAILED DESCRIPTION OF THE PREFERRED EMBODIMENTS

Figure 6:
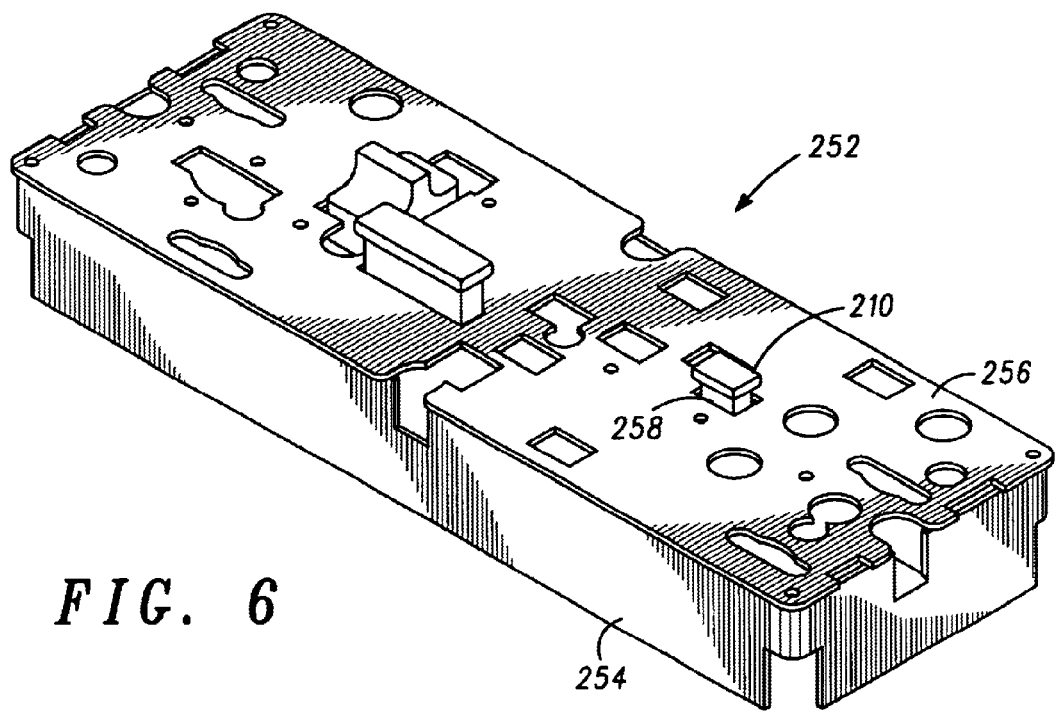
FIG. 6 is a perspective view of an amplifier showing the attenuator pad installed.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

FIGS. 1 and 2 show a first preferred embodiment of the present invention, which comprises an attenuator pad 10 having an electrical component 18 (shown in dashed lines) contained within a housing 12. The electrical component 18 preferably comprises a wafer board 19 connected to at least one, and preferably three downwardly projecting prongs 20, 22, 24. The housing preferably includes an upper portion 16 and a lower portion 14, which are separable at a perforation or separation line 26. The electrical component 18 is preferably located entirely in the lower portion 14.

Figure 7:
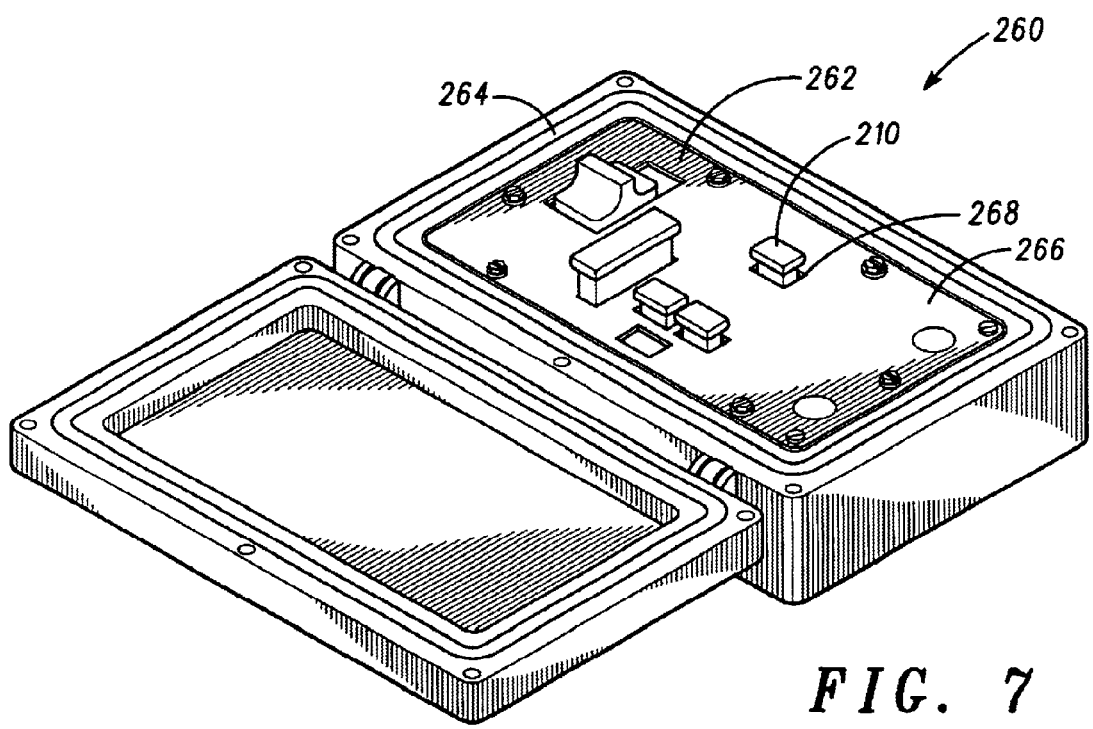
FIG. 7 is a front view of a broadband line extender showing the attenuator pad installed.

In accordance with the present invention, the attenuator 10 is designed to be compatible with both new and older CATV line equipment. When used with newer line equipment (i.e., having accessory openings in the chassis cover as shown in FIGS. 6 and 7), the attenuator 10 is used with the upper portion 16 and lower portion 14 connected which provides an overall height H3 sufficient to allow insertion and removal by hand from line transmission equipment. In order to facilitate hand removal, a handle 30 is preferably provided at the uppermost end of the upper portion 16. In addition, a value marking is preferably placed on the top surface 34 of the upper portion 16 to allow for easy part identification by an installer when the upper portion 16 and lower portion 14 are connected.

When the attenuator 10 is to be installed in older line transmission equipment, the installer can break the housing 12 along the perforation 26, which releases the upper portion 16 from the lower portion 14. The height H1 of the lower portion 14 is preferably designed to allow insertion thereof beneath the chassis cover of older line transmission equipment. Optionally, the lower portion 14 may also include a handle 28 at its uppermost end to facilitate hand removal and installation (i.e., without needing tools). The lower portion 14 and upper portion 16 are preferably made of a rigid polymeric material. The value marking located on the top surface 34 of the upper portion 16 may also be shown on a side surface 32 of the lower portion 14.

Optionally, the lower portion 14 of the attenuator 10 can be made of the same color material as the accessory used exclusively with older line transmission equipment and the upper portion 16 of a different color. This color scheme is intended to avoid confusion of installers who are used to a particular color scheme for the older part.

The present invention is, of course, not limited to an attenuator 10. The structure of the housing 12 could be used with other types of line transmission equipment accessories, such as equalizers, for example.

FIG. 3 shows a first alternative embodiment of the present invention in which like elements in alternative preferred embodiments are represented by reference numerals increased by factors of 100 (for example, the attenuator 10 in FIGS. 1 and 2 correspond to the attenuator 110 in FIG. 3 and the attenuator 210 in FIGS. 4 and 5). FIG. 3 shows an attenuator 110 having a lower portion 114 joined to an upper portion 116 by a dovetail joint 136. In this embodiment, separation of the upper portion 116 from the lower portion 114 is accomplished by sliding the upper portion 116 relative to the lower portion 114 along the dovetail joint 136. Preferably, the dovetail joint 136 provides a snug, friction-fit to avoid unintentional separation of the upper portion 116 from the lower portion 114.

FIGS. 4 and 5 show a second alternative embodiment of the present invention, which comprises an attenuator 210 having a lower portion 214 joined to an upper portion 216 by a snap-fit joint 251. In this embodiment, the lower portion 214 includes a head 250 which protrudes from the upper end of the lower portion 214. The head 250 includes two small protruding lips 238, which when inserted into an opening 240 located on the lower edge of the upper portion 216 snap over retention bars 244, 246 and into an opening 242. The retention bars 244, 246 flex slightly, which facilitates the insertion of the head 250. Preferably, the retention bars 244, 246 provide sufficient pressure to prevent the accidental separation of the lower portion 214 from the upper portion 216, but allows for such separation by hand.

FIGS. 6 and 7 show the present invention installed in two exemplary line transmission devices. FIG. 6 shows a chassis 254 for an amplifier 252 having a removable face plate 256. The attenuator 210 is installed in the amplifier 252 and protrudes through an opening 258. As explained above, protrusion of the attenuator 210 through the opening 258 allows the attenuator 210 to be installed and removed from the chassis 254 without removing the face plate 256. FIG. 7 shows a broadband line extender 260 having a chassis 262 contained within a protective housing 264. The chassis 262 includes a face plate 266. As in FIG. 6, the attenuator 210 is shown installed in the line extender 260 and protrudes through an opening 268 to enable the attenuator 210 to be installed and removed from the chassis 262 without removing the face plate 266.

While the principles of the invention have been described above in connection with preferred embodiments, it is to be clearly understood that this description is made only by way of example and not as a limitation of the scope of the invention.

What is claimed is:

1. An accessory used with a line transmission device having a chassis, the accessory comprising:

a housing having a first portion and a second portion, the first portion having an electronic component contained therein, the electronic component being in electrical communication with the line transmission device when the accessory is installed in the line transmission device; and a connection that connects the first portion and second portion and enables the second portion to be detached from the first portion;

when the second portion is detached from the first portion and the accessory is installed in the line transmission device, the accessory fits entirely within the chassis, and when the second portion is connected to the first portion and the accessory is installed in the line transmission device, the accessory protrudes through an opening in the chassis.

2. The accessory of claim 1, wherein the accessory comprises an attenuator.

3. The accessory of claim 1, wherein the electronic component comprises a wafer-board.

4. The accessory of claim 3, further comprising a plurality of pins projecting downwardly from the first portion, the pins being electrically connected to the wafer-board.

5. The accessory of claim 1, wherein the line transmission device is an RF amplifier.

6. The accessory of claim 1, wherein the connection comprises a perforation.

7. The accessory of claim 1, wherein the connection comprises a dove-tail joint.

8. The accessory of claim 1, wherein the second portion includes a handle to facilitate installation and removal by hand.

9. The accessory of claim 1, wherein the first and second portions each include a value marking.

10. The accessory of claim 1, wherein the first portion is a different color than the second portion.

11. The accessory of claim 1, wherein the first portion is black in color.

12. A universal accessory used with a first line transmission device including a chassis having a first chassis configuration and a second line transmission device including a chassis having second chassis configuration, the accessory comprising:
- a housing having a first portion and a second portion, the first portion having an electronic component contained therein; and
- a connection that connects the first portion and second portion and enables the second portion to be detached from the first portion;
- when the second portion is detached from the first portion the accessory being installable in the first line transmission device so that the accessory fits entirely within the chassis of the first line transmission device, and when the second portion is connected to the first portion the accessory being installable in the second line transmission device so that the accessory protrudes through an opening in the chassis of the second chassis configuration to allow installation and removal of the accessory without removing a face plate of the chassis of the second line transmission device.

13. A method of installing an accessory in a line transmission device having a chassis configuration selected from at least first and second chassis configurations, the method comprising:
- providing a universal accessory having a housing including a first portion, a second portion, and a connection that connects the first portion and second portion and enables the second portion to be detached from the first portion, the first portion having an electronic component contained therein;
- identifying the chassis configuration of the line transmission device; and
- if the line transmission device includes a chassis having the first chassis configuration:
  - removing a face plate from the chassis of the line transmission device;
  - modifying the universal accessory by separating the first portion from the second portion;
  - installing the first portion into the line transmission device so that the electronic component is in electrical communication with the Line transmission device; and
  - re-attaching the face plate to the chassis of the line transmission device; and
- if the line transmission device includes a chassis having the second chassis configuration:
  - installing the universal accessory into the line transmission device through an opening in the chassis so that the electronic component is in electrical communication with the line transmission device.

\* \* \* \* \*

UNITED STATES PATENT AND TRADEMARK OFFICE
CERTIFICATE OF CORRECTION

PATENT NO. : 6,778,035 B2
DATED : August 17, 2004
INVENTOR(S) : Eisenhart et al.

It is certified that error appears in the above-identified patent and that said Letters Patent is hereby corrected as shown below:

Column 6,
Line 15, after the word "the", delete "Line" and insert therefor -- line --.

Signed and Sealed this

Twenty-second Day of February, 2005

JON W. DUDAS
*Director of the United States Patent and Trademark Office*